United States Patent [19]

Reinhardt et al.

[11] 4,417,039

[45] Nov. 22, 1983

[54] CIS-ENYNE AROMATIC AND AROMATIC HETEROCYCLIC POLYMERS

[75] Inventors: Bruce A. Reinhardt, New Carlisle; Fred E. Arnold, Centerville, both of Ohio

[73] Assignee: The United States of America as represented by the Secretary of the Air Force, Washington, D.C.

[21] Appl. No.: 399,661

[22] Filed: Jul. 19, 1982

[51] Int. Cl.$^3$ .............................................. C08F 38/04
[52] U.S. Cl. .................................... 526/285; 526/120; 526/294; 526/295; 528/125; 528/170; 528/171; 528/210; 528/377; 528/391
[58] Field of Search ............... 526/285, 295, 293, 294, 526/120; 528/86, 205, 125, 170, 171, 210, 377, 391

[56] References Cited

U.S. PATENT DOCUMENTS

| | | | |
|---|---|---|---|
| 1,707,940 | 4/1929 | Matheson | 528/205 |
| 2,911,380 | 11/1959 | Doldens | 528/86 |
| 3,821,153 | 6/1974 | White | 528/205 |
| 4,147,858 | 4/1979 | Evers | 528/210 |
| 4,162,265 | 7/1979 | Arnold et al. | 260/578 |
| 4,178,428 | 12/1979 | Arnold et al. | 528/174 |
| 4,187,539 | 2/1980 | Picklesimer et al. | 528/125 |
| 4,220,750 | 9/1980 | Reinhardt | 528/172 |
| 4,276,467 | 6/1981 | Bilow et al. | 528/125 |

FOREIGN PATENT DOCUMENTS

| | | | |
|---|---|---|---|
| 963998 | 3/1965 | Canada | 528/205 |
| 1020670 | 2/1966 | United Kingdom | 526/285 |
| 238163 | 2/1969 | U.S.S.R. | 526/285 |

OTHER PUBLICATIONS

F. Cassar, Journal of Organometallic Chem. 93, (1975), 253–257.

*Primary Examiner*—Joseph L. Schofer
*Assistant Examiner*—Peter F. Kulkosky
*Attorney, Agent, or Firm*—Donald J. Singer; Charles E. Bricker

[57] ABSTRACT

Aromatic and aromatic heterocyclic enyne polymers are prepared by reacting a di-$\beta$-bromovinylbenzene and a diacetylenic compound. The polymers have relatively low glass transition temperatures for fabrication, and after heat treatment exhibit high glass transition temperatures, as well as low solvent susceptibility. Also provided is a new composition of matter 1,4-bis-(cis-$\beta$-bromovinyl)benzene.

16 Claims, No Drawings

CIS-ENYNE AROMATIC AND AROMATIC HETEROCYCLIC POLYMERS

RIGHTS OF THE GOVERNMENT

The invention described herein may be manufactured and used by or for the Government of the United States for all governmental purposes without the payment of any royalty.

BACKGROUND OF THE INVENTION

This invention relates to aromatic thermoplastic materials, particularly thermoplastic materials having enyne moieties in the polymer backbone.

Fiber-reinforced composites are widely used in a great variety of applications. Generally such composites have heretofore employed thermosetting resins. In recent years there has been increased interest in utilizing thermoplastic materials in place of the thermosetting materials, in order to reduce the processing cost of such fiber-reinforced composites. In order to replace thermosetting materials with thermoplastic materials, the latter must exhibit enough of the desirable physical and chemical properties of the former to make the exchange worthwhile. For certain applications, the polymeric material must be resistant to attack by solvents, such as paint strippers and brake and hydraulic fluids. It is also desirable that the polymeric material be suitable for use in a high temperature environment, i.e., at a temperature of about 200° C. and above. Known thermoplastic polymers having the desired high temperature property also have high glass transition temperatures, thus require high fabrication temperatures. What is desired is a thermoplastic polymer having a relatively low glass transition temperature, which can be employed in high temperature environments and which has low solvent susceptibility.

It is therefore an object of the present invention to provide a novel thermoplastic polymeric material.

It is another object of this invention to provide a process for producing a novel thermoplastic polymeric material.

It is yet another object of this invention to provide a new composition of matter.

Other objects and advantages of the present invention will be apparent to those skilled in the art from a consideration of the following disclosure.

In accordance with the present invention there is provided a thermoplastic polymer having the following general formula:

wherein Ar is 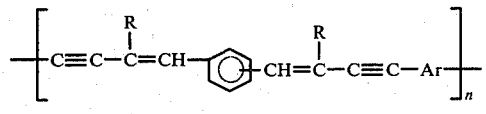

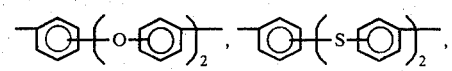

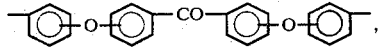

-continued

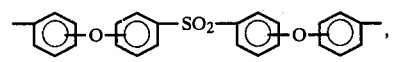

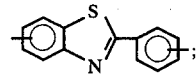

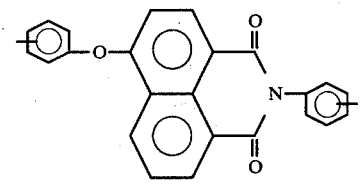

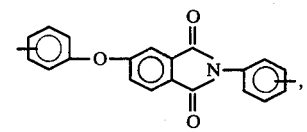

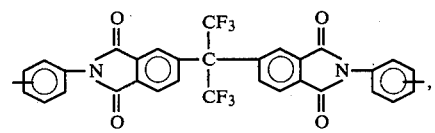

and R is —H or 

In a presently preferred embodiment the polymer I has the cis-enyne configuration, as illustrated, for example, by the following formula:

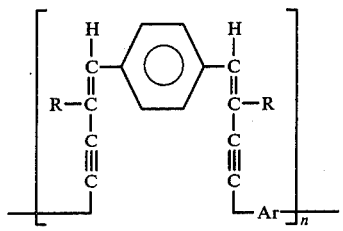

The polymer I is made by reacting a di-β-bromovinyl benzene and a diacetylenic compound in the presence of a suitable catalyst in a suitable reaction medium, as illustrated by the following reaction:

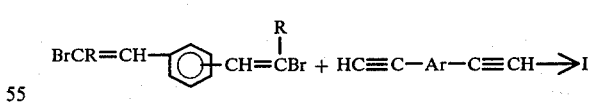

The di-β-bromovinyl benzene reactants which may be employed in this invention include cis- and trans-1,2-di-β-bromovinyl benzene, -1,3-di-β-bromovinyl benzene, and -1,4-di-β-bromovinyl benzene, and cis- and trans-1,2-bis(2-bromo-2-phenylvinyl)benzene, -1,3-bis(2-bromo-2-phenylvinyl)benzene, and -1,4-bis(2-bromo-2-phenylvinyl)benzene.

The di-β-bromovinyl benzenes may be prepared by reacting a phenylenediacrylic acid with bromine and thereafter treating the intermediate product with a suitable base, such as sodium bicarbonate, as illustrated by the following reaction

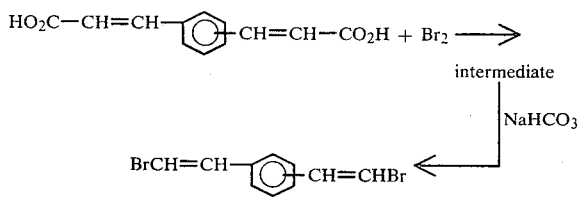

The diacetylenic compounds which may be employed in this invention include diethynyl benzene, di-p-ethynylphenyl ether, 1,3-bis(3-ethynylphenoxy)-benzene, 4,4'-bis(3-ethynylphenoxy)diphenylsulfone, 4,4'-bis(4-ethynylphenoxy)diphenylsulfone, di-p-ethynylphenylthioether, 1,3-bis(3-ethynylthiophenoxy)-benzene, 4,4'-bis(3-ethynylphenoxy)benzophenone, 2-(4-ethynylphenyl)-5-ethynylbenzothiazole, 2-(3-ethynylphenyl)-5-ethynylbenzothiazole, 2-(4-ethynylphenyl)-6-ethynylbenzothiazole, 2-(3-ethynylphenyl)-6-ethynylbenzothiazole, N-(3-ethynylphenyl)-4-(3-ethynylphenoxy)naphthalimide, N-(4-ethynylphenyl)-4-(3-ethynylphenoxy)naphthalimide, N-(3-ethynylphenyl)-4-(4-ethynylphenoxy)naphthalimide, N-(4-ethynylphenyl)-4-(4-ethynylphenoxy)naphthalimide, N-(3-ethynylphenyl)-3-(3-ethynylphenoxy)phthalimide, N-(3-ethynylphenyl)-3-(4-ethynylphenoxy)phthalimide, N-(4-ethynylphenyl)-3-(3-ethynylphenoxy)phthalimide, N-(4-ethynylphenyl)-3-(4-ethynyl-phenoxy)phthalimide, 2,2-bis[N-(3-ethynylphenyl)-4-phthalimido]hexafluoropropane, 2,2-bis[N-(4-ethynylphenyl)-4-phthalimido]hexafluoropropane, and the like.

The reaction is carried out under an inert atmosphere in a liquid reaction medium consisting essentially of an aprotic solvent, such as N,N-dimethylacetamide, and from about 10 to 50 percent (v/v) of an HBr acceptor, such as triethylamine. Suitable inert atmospheres include dry nitrogen, argon, helium, Xenon and the like.

The catalyst system consists essentially of cuprous iodide and bis-triphenylphosphine palladium II dichloride. These ingredients are employed in a weight ratio of about 1:2 (cuprous iodide:Pd II complex), and the amount of this catalyst mixture can range from about 2 to about 10 percent by weight of the weight of the reactants.

The reaction may be carried out at a temperature in the approximate range of 5° to 40° C., preferably about 20° to 25° C. The reactants are dissolved in the liquid reaction medium described above and the resulting mixture is stirred for about 24 to 100 hours. The polymer I may be separated from the reaction mixture by pouring the mixture into a suitable liquid which is a non-solvent for the polymer, such as, for example, methanol. The polymer I is then recovered in conventional fashion.

The following example illustrates the invention.

EXAMPLE I 1,4-Bis(cis-β-bromovinyl)benzene

A suspension of 40 g (0.18 mol) of p-phenylenediacrylic acid in 300 g of bromine (100 ml) was allowed to stir for 3 hours at room temperature. At the end of this period the excess bromine was removed under reduced pressure. The resulting solid was used without further purification in the next step of the reaction (mp>300° C.).

A suspension of 21.5 g (0.04 moles) of β,β'-p-phenylene-bis(α,β-dibromopropionicacid) and 20.0 g (0.24 mole) of sodium bicarbonate in 500 ml of dry acetone was heated to reflux for 72 hours. The reaction mixture was cooled, filtered and the acetone removed under reduced pressure. The resulting oily solid was purified by column chromatography on silica gel using hexane as the eluent to give 6.0 g (52% yield) mp 71°–73° C.

Analysis Calc'd for $C_{10}H_8Br_2$: C,41.70; H,2.80; Found: C,41.36; H,2.65

EXAMPLE II

Poly(oxy-p-phenylenesulfonyl-p-phenyleneoxy-m-phenylene-(z)-3-buten-1-ynylene-p-phenylene-(z)-1-buten-3-ynylene-m-phenylene)

A mixture of 0.5 g (1.7 mmole) cis-bis-β-bromostyrene and 0.7658 g (1.7 mmole) of 4,4'-bis(3-ethynylphenoxy)diphenylsulfone was dissolved in a solution made up of 3 ml of triethylamine and 3 ml of n,n-dimethylacetamide. The solution was degassed with dry nitrogen for 20 minutes. Under a nitrogen atmosphere was added the catalyst system composed of 0.025 g cuprous iodide and 0.05 g bis-triphenylphosphine palladium II dichloride. The reaction mixture was allowed to stir for 70 hours at room temperature during which time the viscosity increased to a point where stirring became difficult. To the viscous solution was added 10 ml of n,n-dimethylacetamide and the polymer precipitated into methanol. The polymer was reprecipitated from methylene chloride into methanol, collected and dried under reduced pressure at 60° C. to give 0.95 g (97%) of material with intrinsic viscosity of 0.36.

The glass transition temperature of the polymer was 143° C. as determined by differential scanning calorimetry (DSC). Pelletized samples of the polymer thermally treated at 250° C. for 6 hours under nitrogen showed no glass transition temperature below the decomposition temperature of 375° C. The polymer after thermal treatment was insoluble in all solvents tested.

Analysis Calc'd for $(C_{38}H_{24}SO_4)_n$: C,79.15; H,4.20; Found: C,78.62; H,4.31

EXAMPLE III

Poly(oxy-p-phenylenesulfonyl-p-phenyleneoxy-p-phenylene-(z)-3-buten-1-ynylene-p-phenylene-(z)-1-buten-3-ynylene-p-phenylene)

To a mixture of 0.5167 g (1.14 mmole) cis-bis-β-bromostyrene, 0.3302 g (1.14 mmole) 4,4'-bis(4-ethynylphenoxy)diphenylsulfone, 0.025 g cuprous iodide and 0.05 g bis-triphenylphosphine palladium II chloride was added 7 ml of a degassed 50/50 mixture of triethylamine and n,n-dimethylacetamide. The reactants and catalyst were kept under a nitrogen atmosphere throughout the course of the reaction. The reaction mixture was allowed to stir at room temperature for 72 hours. To the viscous solution was added 10 ml of n,n-dimethylacetamide and the polymer precipitated into methanol. The polymer was reprecipitated from chloroform into methanol, collected and dried under reduced pressure at 60° C. to give 0.63 g (98%) of material with an intrinsic viscosity of 0.44.

The glass transition temperature of the polymer was 160° C. as determined by DSC at a heating rate of 10°/min. Samples of the polymer thermally treated at 250° C. for 6 hours under a nitrogen atmosphere showed no Tg below the decomposition temperature of 375° C. The polymer after thermal treatment was insoluble in all solvents tested.

Analysis Calc'd for $(C_{38}H_{24}SO_4)_n$: C,79.15; H,4.20;
Found: C,79.00; H,3.89

EXAMPLE IV

Poly(oxy-p-phenylenecarbonyl-p-phenyleneoxy-m-phenylene-(z)-3-buten-1-ynylene-p-phenylene-(z)-1-buten-3-ynylene-p-phenylene)

To a mixture of 0.3030 g (1.05 mmole) cis-bis-β-bromostyrene, 0.4362 g (1.05 mmole) 4,4′-bis(3-ethynylphenoxy)benzophenone, 0.025 g cuprous iodide, and 0.05 g bis-triphenylphosphine palladium II chloride was added 7 ml of a degassed 50/50 mixture of triethylamine and n,n′-dimethylacetamide. The reactants and catalyst were kept under a nitrogen atmosphere throughout the course of the reaction. The reaction mixture was allowed to stir at room temperature for 72 hours. To the viscous solution was added 10 ml of n,n-dimethylacetamide and the polymer precipitated into methanol. The polymer was reprecipitated from chloroform into methanol, collected and dried under reduced pressure at 60° C. to give 0.53 g (94.6%) of material with an intrinsic viscosity of 0.28.

The Tg of the polymer was 114° C. as determined by DSC at a heating rate of 10°/min. Samples of the polymer thermally treated at 250° C. for 6 hours under a nitrogen atmosphere showed no Tg below the decomposition temperature of 375° C. The polymer after thermal treatment was insoluble in all solvents tested.

Analysis Calc'd for $(C_{39}H_{24}O_4)_n$: C,86.64; H,8.87; Found: C,86.24; H,8.41

Various changes and modifications may be made in the invention described above without departing from the spirit thereof or the scope of the following claims.

We claim:

1. A polymer having repeating units of the general formula:

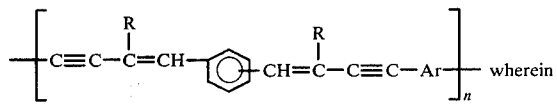

wherein Ar is

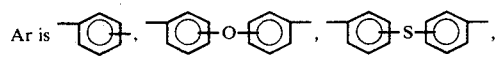

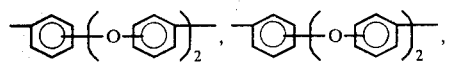

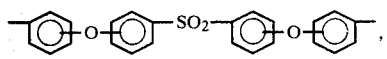

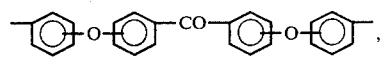

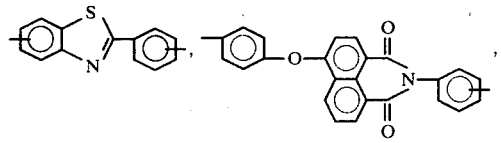

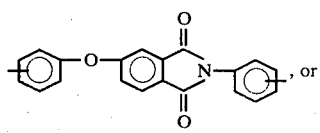, or

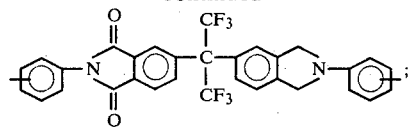

and R is —H or .

2. A polymer in accordance with claim 1 and having the cis-configuration.

3. A polymer in accordance with claim 1 and having the transconfiguration.

4. The polymer of claim 2 wherein each R is —H, and Ar is

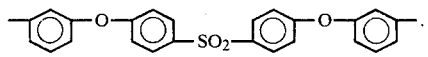

5. The polymer of claim 2 wherein each R is —H, and Ar is

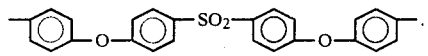

6. The polymer of claim 2 wherein each R is —H, and Ar is

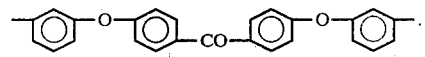

7. The polymer of claim 2 wherein R is —H and Ar is a phenylene group.

8. The polymer of claim 2 wherein R is —H and Ar is

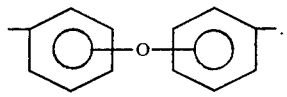

9. The polymer of claim 2 wherein R is —H and Ar is

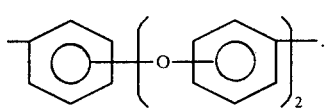

10. A method for producing a polymer having repeating units as follows:

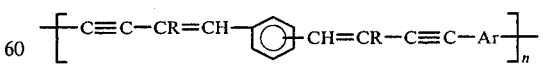

wherein Ar is

-continued

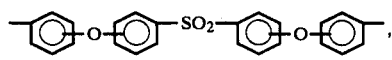

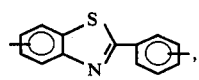

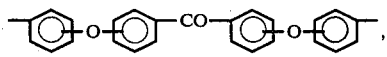

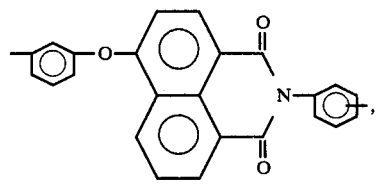

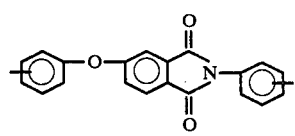

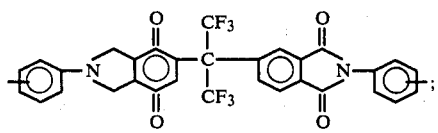

-continued and R is —H or ;

which comprises reacting a di-β-bromobenzene of the general formula

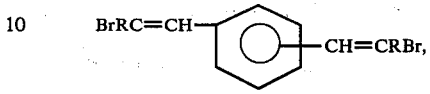

wherein R is as described above, with a diacetylenic compound of the general formula HC≡C—Ar—C≡CH, wherein Ar is as described above, in the presence of a catalyst consisting essentially of cuprous iodide and bis-triphenylphosphine palladium II dichloride, in a reaction medium.

11. The method of claim 10 wherein the weight ratio of said cuprous iodide to said palladium complex is about 1:2.

12. The method of claim 10 wherein the amount of said catalyst system is about 2 to 10 weight percent.

13. The method of claim 10 wherein said reaction is carried out at a temperature in the approximate range of 5° to 40° C.

14. The method of claim 13 wherein said reaction range is about 20° to 25° C.

15. The method of claim 10 wherein said reaction medium consists essentially of an aprotic solvent and about 10 to 50 percent of an HBr acceptor.

16. The method of claim 15 wherein said reaction medium is a mixture of N,N-dimethylacetamide and triethylamine.

* * * * *